(12) United States Patent
Master et al.

(10) Patent No.: US 8,433,431 B1
(45) Date of Patent: Apr. 30, 2013

(54) DISPLAYING TEXT TO END USERS IN COORDINATION WITH AUDIO PLAYBACK

(75) Inventors: Aaron Master, Palo Alto, CA (US); Kamyar Mohajer, San Jose, CA (US); Keyvan Mohajer, Los Gatos, CA (US); Timothy P. Stonehocker, Sunnyvale, CA (US); Bernard Mont-Reynaud, Sunnyvale, CA (US)

(73) Assignee: Soundhound, Inc., San Jose, CA (US)

( * ) Notice: Subject to any disclaimer, the term of this patent is extended or adjusted under 35 U.S.C. 154(b) by 0 days.

(21) Appl. No.: 13/372,399

(22) Filed: Feb. 13, 2012

Related U.S. Application Data

(63) Continuation of application No. 13/310,630, filed on Dec. 2, 2011, and a continuation-in-part of application No. 12/629,821, filed on Dec. 2, 2009, said application No. 13/310,630 is a continuation-in-part of application No. 13/193,514, filed on Jul. 28, 2011.

(60) Provisional application No. 61/419,123, filed on Dec. 2, 2010, provisional application No. 61/565,755, filed on Dec. 1, 2011, provisional application No. 61/119,156, filed on Dec. 2, 2008, provisional application No. 61/368, 735, filed on Jul. 29, 2010.

(51) Int. Cl.
*G06F 17/00* (2006.01)

(52) U.S. Cl.
USPC .............................. 700/94; 715/727

(58) Field of Classification Search .................... 700/94; 715/727
See application file for complete search history.

(56) References Cited

U.S. PATENT DOCUMENTS

| 4,928,249 | A  | * | 5/1990  | Vermesse ..................... 358/1.11 |
| 6,542,869 | B1 |   | 4/2003  | Foote |
| 6,633,845 | B1 |   | 10/2003 | Logan et al. |
| 7,323,629 | B2 |   | 1/2008  | Somani et al. |
| 7,328,153 | B2 |   | 2/2008  | Wells et al. |
| 7,373,209 | B2 |   | 5/2008  | Tagawa et al. |

(Continued)

FOREIGN PATENT DOCUMENTS

| EP | 1367590 A2 | 12/2003 |
| WO | WO 2010018586 A2 * | 2/2010 |

OTHER PUBLICATIONS

International Search Report, appl. No. PCT/2009.066458, mailed Jun. 23, 2010.

(Continued)

*Primary Examiner* — Joseph Saunders, Jr.
(74) *Attorney, Agent, or Firm* — Haynes, Beffel & Wolfeld LLP; Ernest J. Beffel, Jr.

(57) ABSTRACT

Technologies described relate to coordination between audio and tracking of the corresponding text in an audio recognition mode and an audio playback mode. Optionally, audio recognition includes receiving a signal corresponding to an audio track; determining an identity of the audio track and a current audio position within the audio track; displaying on a display a portion of a text that is linked and synchronized to the audio track identified and automatically scrolling the portion of the text displayed in pace with the audio track playing; and displaying a current text indicator that emphasizes current text, wherein the current text indicator is visually synchronized on the display to current audio playing from the audio track. Optionally include redetermining the current audio position in the audio track from the signal received and updating synchronization of the current text indicator with the current audio playing.

18 Claims, 6 Drawing Sheets

U.S. PATENT DOCUMENTS

| | | | |
|---|---|---|---|
| 7,379,875 B2 | 5/2008 | Burges et al. | |
| 7,580,832 B2 | 8/2009 | Allamanche et al. | |
| 7,756,874 B2 | 7/2010 | Hoekman et al. | |
| 7,908,135 B2 | 3/2011 | Shishido | |
| 8,013,230 B2 | 9/2011 | Eggink | |
| 8,073,684 B2 | 12/2011 | Sundareson | |
| 2001/0005823 A1 | 6/2001 | Fischer et al. | |
| 2002/0072982 A1* | 6/2002 | Barton et al. | 705/26 |
| 2002/0193895 A1* | 12/2002 | Qian et al. | 700/94 |
| 2003/0192424 A1* | 10/2003 | Koike | 84/477 R |
| 2006/0122839 A1 | 6/2006 | Li-Chun Wang et al. | |
| 2007/0055500 A1 | 3/2007 | Bilobrov | |
| 2007/0168413 A1* | 7/2007 | Barletta et al. | 709/203 |
| 2007/0260634 A1* | 11/2007 | Makela et al. | 707/104.1 |
| 2008/0026355 A1* | 1/2008 | Petef | 434/307 A |
| 2009/0228799 A1* | 9/2009 | Verbeeck et al. | 715/727 |
| 2011/0276334 A1 | 11/2011 | Wang et al. | |

* cited by examiner

DISPLAYING TEXT TO END USERS IN COORDINATION WITH AUDIO PLAYBACK

RELATED APPLICATIONS

This application is related to and claims priority as a continuation of U.S. patent application Ser. No. 13/310,630, entitled "Displaying Text to End Users in Coordination with Audio Playback", filed on Dec. 2, 2011, which claims the benefit of two U.S. Provisional patent applications, U.S. Prov. App. No. 61/419,123, entitled "System and Method for Displaying Lyrics to End Users in Coordination with Audio Playback", filed on Dec. 2, 2010; and U.S. Prov. App. No. 61/565,755, entitled "Displaying Text to End Users in Coordination with Audio Playback", filed on Dec. 1, 2011. The Ser. No. 13/310,630 non-provisional and 61/565,755 provisional applications are hereby incorporated by reference.

The priority application Ser. No. 13/310,630, in turn, is related to and claims priority as a continuation-in-part of U.S. patent application Ser. No. 12/629,821, entitled "System and Method for Identifying Original Music", filed on Dec. 2, 2009; and to U.S. patent application Ser. No. 13/193,514, entitled "Systems and Methods for Continuous Audio Matching", filed on Jul. 28, 2011, which claims the benefit of U.S. Prov. App. No. 61/368,735, entitled "System and Methods for Continuous Audio Matching", filed on Jul. 29, 2010. The related non-provisional priority applications are hereby incorporated by reference.

BACKGROUND

The specification relates to audio recognition and coordination between audio and tracking of the corresponding text. It also relates to coordination between audio playback and tracking of the corresponding text.

Music enthusiasts have a general desire to view song lyrics while listening to the relevant audio. Traditionally, such users do so by viewing a static lyrics page, and manually scrolling through the lyrics and finding the exact line or words of the lyrics that are being uttered by the artists at a particular time.

SUMMARY

The specification describes technologies relating to coordination between audio and tracking of the corresponding text, in an audio recognition mode and an audio playback mode.

In general, one aspect of the technology disclosed can be embodied in methods that include the actions of receiving a signal corresponding to an audio track; determining from the signal, either directly or indirectly, an identity of the audio track and a current audio position within the audio track; displaying on a display a portion of a text that is linked and synchronized to the audio track identified and automatically scrolling the portion of the text displayed in pace with the audio track playing; and displaying a current text indicator that emphasizes current text, wherein the current text indicator is visually synchronized on the display to current audio playing from the audio track. The actions optionally include periodically redetermining the current audio position in the audio track from the signal received and updating synchronization of the current text indicator with the current audio playing. Other embodiments of this aspect include corresponding systems, apparatus, and computer program products.

Another aspect of the technology described can be embodied in methods that include the actions of playing an audio track; displaying on a display a portion of a text that is linked and synchronized to the audio track identified and automatically scrolling the portion of the text displayed in pace with the audio track playing; displaying a current text indicator that emphasizes current text, wherein the current text indicator is visually synchronized on the display to the current audio playing from the audio track; and responsive to user interaction with the display that selects a playback position from within the portion of the text displayed, controlling the current audio being played to reset the current audio being played to the selected playback position. When the text more than fills portion of the display available, the actions may include, responsive to user interaction with the display that scrolls the current text indicator beyond an area visible on the display, displaying an updated portion of the text as the audio track continues to play. The actions optionally include, responsive to user interaction with the display that scrolls the current text indicator beyond an area visible on the display, at least temporarily suspending the automatic scrolling of the portion of text displayed. Other embodiments of the optional aspects include corresponding systems, apparatus, and computer program products.

These and other embodiments can optionally include one or more of the features described below.

Particular embodiments of the technology disclosed can be implemented to realize one or more of the following advantages. User experience may be enhanced by displaying the song lyrics or other text to the user in coordination with the audio listening, in an audio recognition mode and an audio playback mode, which allows the user to identify which part of the text, such as lyrics, is being uttered by the artist at a particular time. In playback mode, it also allows the user to select audio based by interacting with particular text.

The details of one or more embodiments of the technology disclosed in this specification are set forth in the accompanying drawings and the description below. Other features, aspects, and advantages of the technology disclosed will become apparent from the description, the drawings and the claims.

DETAILED DESCRIPTION

The technology disclosed assumes availability of a database of text, such as song lyrics, synchronized with the relevant audio files. An example of such database is a plurality of LRC files (sometimes used in Karaoke applications) associated with the relevant audio tracks.

Two applications of the technology disclosed for display of lyrics in coordination with audio playback include: 1) when audio is played from an external source (i.e. audio playback does not occur from the device within which text is displayed) and 2) for embedded audio playback (i.e. audio is played from the same device within which the text is displayed). Both applications are described below.

Figure 1:
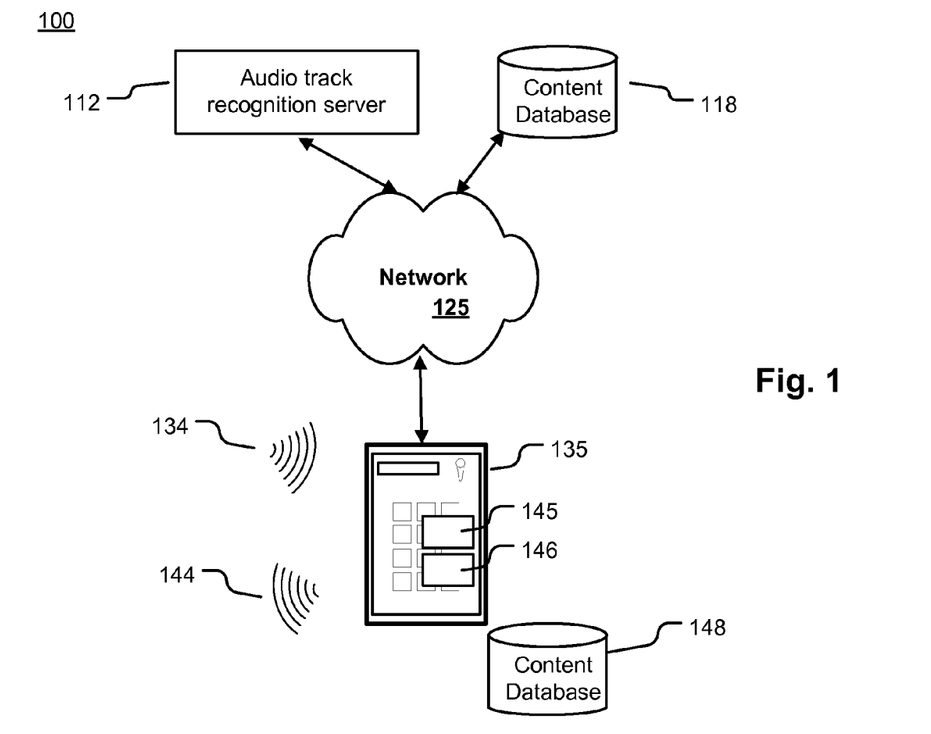
FIG. 1 illustrates a block diagram of an example environment in which displaying text in coordination with audio playback can be used.

FIG. 1 illustrates a block diagram of an example environment in which displaying text in coordination with audio playback can be used. The environment 100 includes one or more computing devices 135 and an audio track recognition server 112. The environment also includes a communication network 125 that allows for communication between various components of the environment 100.

During one mode of operation, users interact with the audio track recognition server 112 through a computing device 135 such as a smart phone, tablet, laptop or desktop computer. The computing device 135 and server each include memory for storage of data and software applications, a processor for accessing data and executing applications, and components that facilitate communication over the communication network 125. The computing device 135 in some implementations has an audio input 134 and an audio output 144. For example, it may include a microphone and speaker or a port for external audio input and output, such as a microphone or earphone jack or a Bluetooth wireless connection to audio input and output. In some implementations, only audio input is required. The computing device 135 executes applications such as a text coordinated with a client audio module 145 and a music player module 146. The text coordinated with audio module 145 permits the user to view text as music plays. This module may be coupled in communication with a microphone on the computing device 135 that permits the module to capture an audio signal. This module may be integrated with or engage in inter-process communication with a music player module 146 that permits the user to play music. In some implementations, the computing device 135 sends the audio track recognition server 112 data including signal samples or features of signal samples. This data optionally includes a time stamp indicating the time at which the audio was captured, sent and/or streamed. Once the server receives the input from the client, an audio or music recognition module identifies the audio being input through the client. The recognition module may employ an audio identification technique, such as those described in the patent applications incorporated by reference. Alternatively, it may employ any conventional audio identification technique that identifies the audio and a position within the audio. The audio recognition may be divided between the computing device 135 and the audio track recognition server 112.

Both of the computing device 135 and the audio track recognition server 112 may have a content database, 148 and 118, respectively. The server content database 118 may be local to the audio track recognition server 112 or it may be connected by a network 125. It may reside on one or more memory devices. The memory devices may be dynamic memory such as RAM, persistent solid state memory such as an SSD, on rotating memory such as a disk array, or on any other conventional memory. Similarly, the computing device content database 148 may reside on one or more conventional memory devices that may be integrated into or local to the computing device 135.

The computing device 135 receives from the audio track recognition server 112 the most likely point in the matched song to which the currently playing music matches, as well as the time stamp when the match was achieved. The server may then return to the client one or a combination of the following data: timing information about how far into the song the match occurred; lyrics data including words and timings of lines or on other levels; and an estimate of how much longer the client should wait before resending more information to automatically re-sync lyrics. An estimate of when to redetermine the current audio position is useful in the case where the portion of music initially recognized contains audio that is repeated during the song, such as in a chorus. The server also may return an estimate of how long the current sync data is valid. For example, if the lyrics were to be synced during a chorus, the chorus might end and it would be unclear which verse's lyrics to show next. In that case the time validity estimate would be however many seconds exist before the new verse begins. It further may return information about network latency, which can be taken into account to more closely match display of text to audio playback.

The network 125 facilitates communication between the between the various components in the environment 100. In one implementation, the network 125 includes the Internet. The network 125 can also utilize dedicated or private communication links that are not necessarily part of the Internet, such as cellular, LTE or WiMax communications. In one implementation, the network 125 uses standard communications technologies, protocols, and/or inter-process communication techniques.

Many other configurations are possible having more or less components than the environment 100 shown in FIG. 1. For example, the environment can include multiple audio track recognition severs 112 and multiple computing devices 135.

Figure 2:
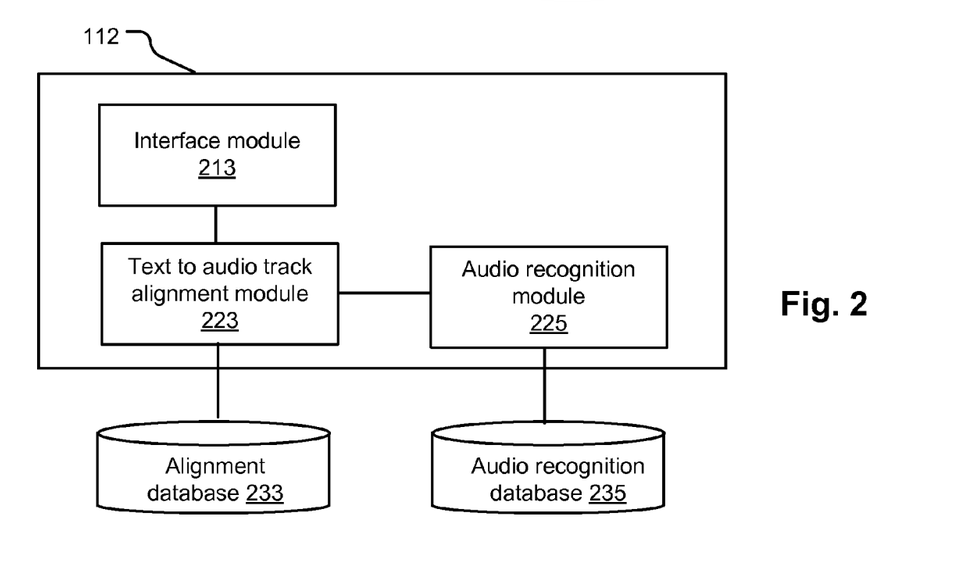
FIG. 2 illustrates a block diagram of an example audio track recognition server.

FIG. 2 illustrates a block diagram of an example audio track recognition server 112. Alternatively, the modules identified in this figure could reside on the computing device 135. In this figure, the content database 118 is illustrated as being bifurcated between an alignment database 233 and an audio or music recognition database 235, which may reside on one or more conventional memory devices.

At least one interface module 213 handles communications via the network 125. Messages from and to the computing device 135 pass through the interface module 213. Messages are illustrated as being routed through the text to audio track alignment module 223, but could alternatively be routed through the recognition module 225. Custom protocols for communication between the computing device 135 and the server 112 may be implemented in the recognition module 225.

The audio or music recognition module 225 receives data from the computing device and identifies an audio track and a current audio position within the audio track. The actions of the music recognition module 225 are supported by at least one music recognition database 235. The recognition module 225 returns information such as audio track name and timing data, as described above.

The text to audio track alignment module 223 utilizes audio track and audio position information to provide text information, such as lyrics. The audio track alignment module is supported by an alignment database 233. An example of an alignment database 233 is a collection of LRC files or a database into which data from LRC files have been compiled. These LRC files are conventionally used with Karaoke devices. The alignment module 223 accesses data in the alignment database 233 based on results returned by the recognition module 225. The alignment module 223 adds to the data stream at least text data.

The interface module 213 optionally may calculate network latency data and return it along with information supplied by the recognition and alignment modules 225, 223.

When the client 145 begins to play a song embedded on the device (or realizes it will do so soon), it may send audio for various excerpts of the song to the server, and/or metadata describing the song. The text to audio track alignment module 223 verifies that the audio and/or meta-data received from the client matches the relevant record(s) within the alignment database 233. If audio is used for this verification process, the recognition module 225 may be employed to perform the audio matching. In order to maximize efficiency, the recognition module 225 may use the metadata sent by the client to search a smaller audio space to perform this verification. In certain embodiments of the technology disclosed, audio may not be sent to the audio track recognition server 112 for verification, in which case, other metadata such as song length may be employed to increase the accuracy and the efficiency of the system. Optionally, the system could choose to return a code indicating that lyrics could not be synced, so that the client 145 could fall back to display non-synced lyrics.

Figure 3:
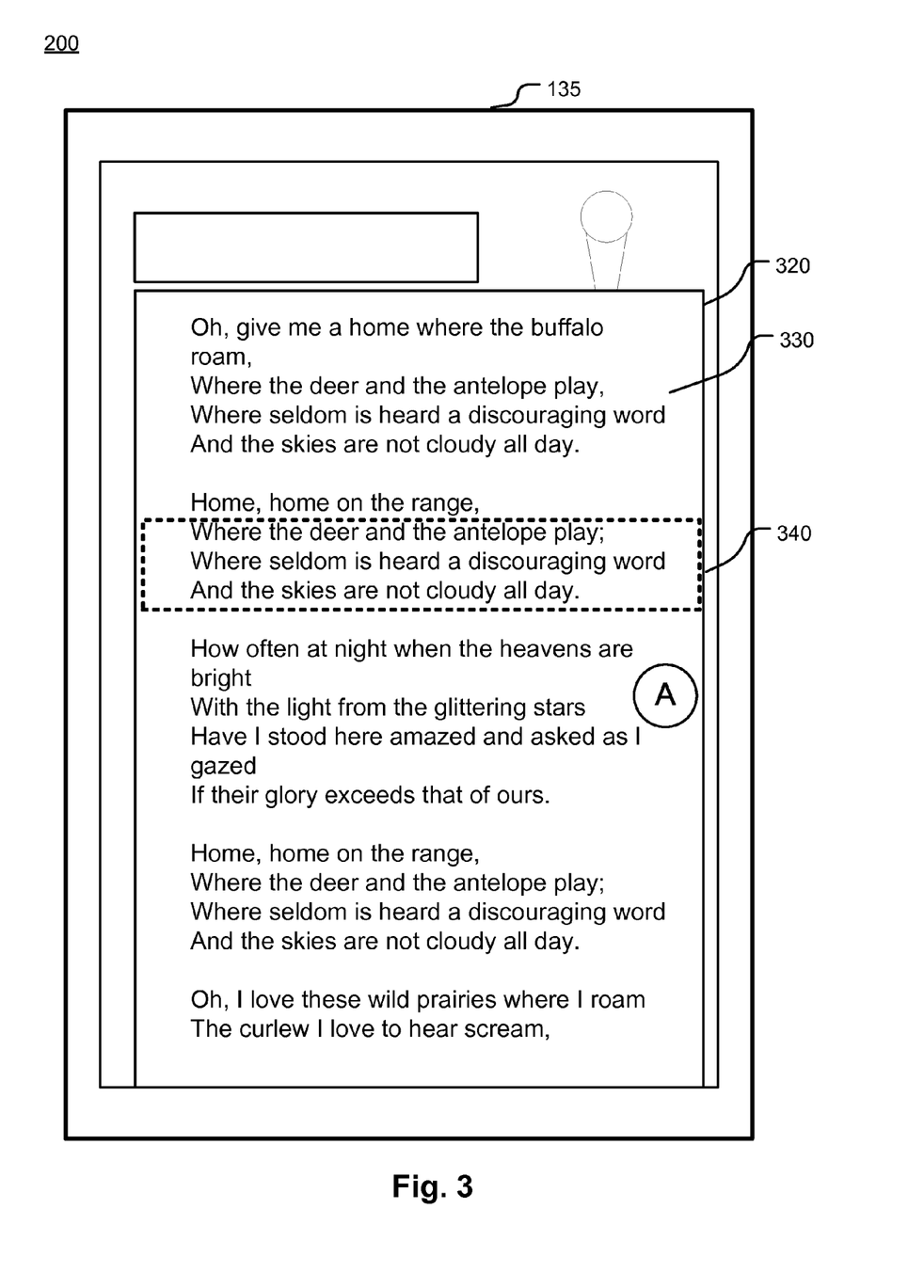
FIG. 3 is a screen shot of an example interface for displaying text in coordination with audio playback.

FIG. 3 is a screen shot of an example interface for displaying text in coordination with music playback. While much of the description in this disclosure is stated in terms of music and lyrics, the technology disclosed is not so limited. It generally applies to audio and text. The audio may be part of a video, multi-media display or other content accompanied by audio. The interface described applies to both coordination with music recognition and to coordination with music playback. This interface is displayed by a computing device 135. It includes an interface window 320, lyrics 330 and a current text indicator 340. Not shown is an optional window locking control. In some implementations, the interface is implemented on a touchscreen that accepts user scrolling commands as simple a finger swipe. Lyrics 330 are displayed in the window 320 coordinated with audio that is playing. The lyrics 330 may be limited to a stanza or paragraph in some implementations and may include much more text in other implementation. The lyrics 330 can be automatically scrolled through the window 320 as the music plays. When lyrics corresponding to the music passage playing are visible in the window 320, a current text indicator 340 emphasizes the current lyrics.

Figure 4:
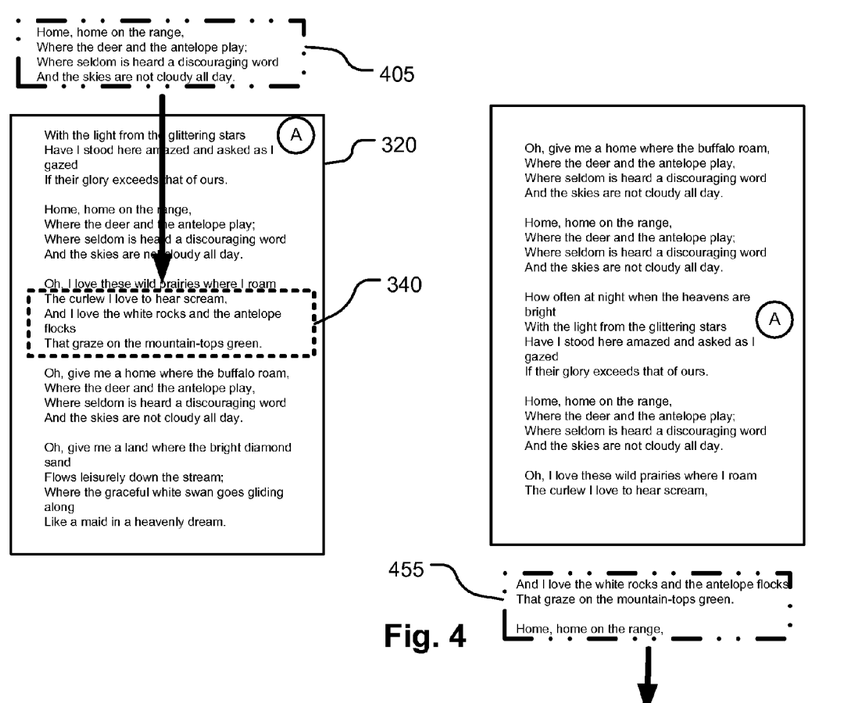
FIG. 4 is a pair of screen shots of an example interface illustrating scrolling of a current text indicator to positions above and below the portion of text visible on the display.

The user optionally scrolls the lyrics 330 so that the current lyrics are outside the window 320, either above or below the portion of the lyrics being displayed. To help illustrate the position of lyrics 320 within window 330, FIGS. 3-4 are marked with an "A" at the line "With the light from the glittering stars" in the familiar tune, "Home on the Range." In FIG. 3, the current text indicator 340 is near the center of the window 320. This is one way that the interface may appear as the lyrics automatically scroll in time with the music. FIG. 4 is a pair of screen shots of an example interface illustrating scrolling of a current text indicator to positions above and below the portion of text visible on the display. Current text indicator 405 provides an example of a user having scrolled to see upcoming lyrics and having scrolled far enough that the current text indicator 405 is not visible in the current text window 320. This may suspend automatic scrolling of the lyrics. As the music plays, the current text indicator moves across the lyrics in the direction of the arrow to the position of current text window 340. In some implementations, when the current text indicator 405 is visible within the window 320 or approaches the center of the window where 340 appears, the lyrics resume scrolling automatically. Optionally, the user can lock the lyrics in place so that the current text indicator moves off the bottom of the screen to the position 455.

The second screen shot in FIG. 4 depicts the current text indicator 455 in a position below the portion of the lyrics being displayed. As the music plays, the virtual position of the current text indicator 455 recedes further from being visible in the window 320.

The interface in FIGS. 3-4 supports direct user interaction with the lyrics. The user can scroll the lyrics up or down and look at upcoming or already past lyrics. The user can see just where the music is in the track being played. In a touchscreen implementation, the user can directly move the lyrics.

During music playback, as opposed to recognition, the interface further supports jumping to a position in the music, resetting the current audio being played to a selected playback position. A single or double tap on a touchscreen can directly select the position in the music from which playback proceeds. This direct selection may be a single action, without requiring the user to follow up their selection in the text window with pressing a button or uttering a command to confirm the direct selection. On a display other than a touchscreen, another conventional navigation device such as a mouse, track pad, track ball or joy stick can be used. Voice navigation also can be supported.

Figure 5:
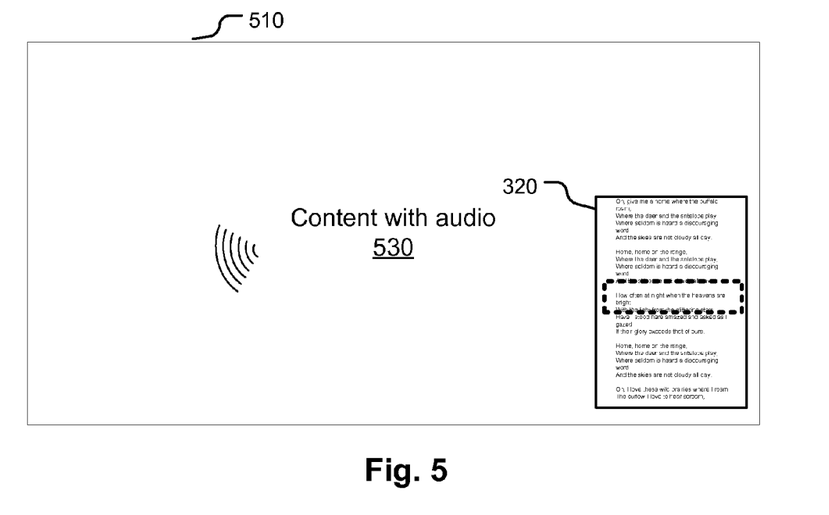
FIG. 5 is a screen shot of an example interface appearing as a picture-in-picture on a larger display.

FIG. 5 is a screen shot of an example interface appearing as a picture-in-picture on a larger display. This illustrates application of the technology disclosed as part of a larger display of video or other content with audio 530. For instance, a transcript of a program could be displayed in this manner and access to parts of the program controlled by scrolling through the window 320. Or, lyrics of a music video could be displayed and playback of the music video similarly controlled. Audio could accompany a slide show or photo montage, a TV show, movie, ad, live performance with sound cues or recordings of cheers played at sporting events. This figure illustrates direct interaction between a user and text on a device that is not handheld and that may not have a touchscreen.

Figure 6:
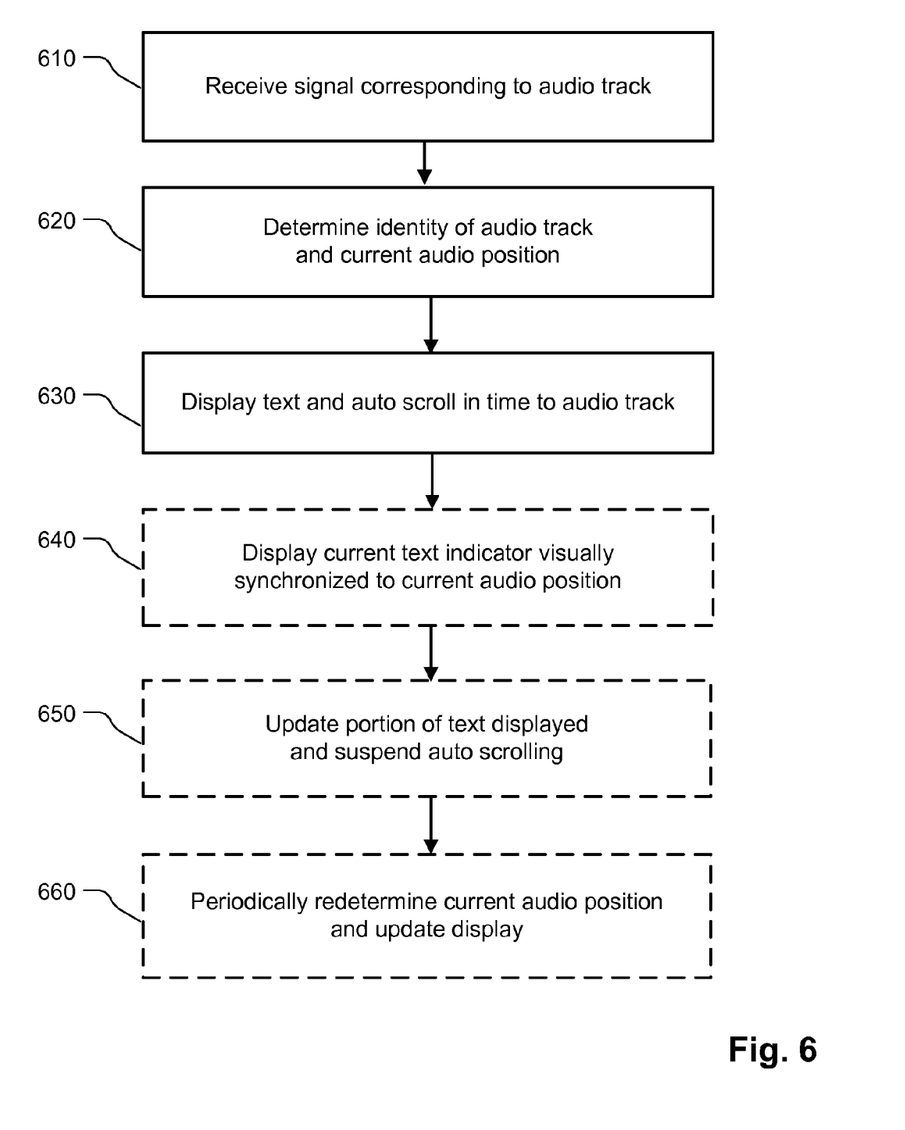
FIG. 6 is a flow chart illustrating an example process for displaying text in coordination with audio playback when the playback is from an external source.

FIG. 6 is a flow chart illustrating an example process for displaying text in coordination with audio playback when the playback is from an external source. For convenience, this example process will be described with respect to a system that performs at least part of the method. In one scenario, a user hears a song playing from a speaker, for example, in a bar or car environment. The user launches a client 145 on a computing device 135 incorporating the technology disclosed.

The system receives a signal corresponding to an audio track 610. The signal may be captured from an external source as an audio track that is playing, for example using a microphone incorporated in or coupled to the computing device 135. The audio track may be accompanied by video or multi media content, without requiring capture of the corresponding visual.

The system determines an identity of the audio track and a current audio position within the audio track 620. This can be done locally on the computing device 135 or in communication with an audio track recognition server 112. The client 145 attempts to identify the audio being played. If and when the client returns a positive result, a new page shows the lyrics, displayed in coordination with the song playing from the external source. In some implementations, synchronized text is linked to a particular audio file, instead of through a title of a song or other audio track. An advantage of linking to an audio file instead of generically linking to all performances of a work is that the timing will be visually synchronized to the audio, instead of being approximate. In other implementations, approximate timing might be used for a work instead of a particular audio file.

The client 145 may compensate for network latency by making decisions regarding correct timing information related to uttered lyrics after converting reference-based timestamps received from the audio track recognition server 112 to local clock time if/when necessary. In such a case, when the music recognition module 225 responds to a search or re-sync query from a client, it would return the timing information and an expiration date as positions in the reference audio, relative to the start position of the reference audio. Once the client receives the response from the server, it can shift the timing information received from the server according to the passage of time, based on the knowledge of when (on the client's clock) the query audio had been recorded.

The clocks may not be synced in an explicit way. The basic idea is that alignments are communicated in a way that is insensitive to real-time clocks, and that decisions may be made by a client after converting (stable) reference-based timestamps to local clock time if and when necessary. The music recognition module's responses to a search or resync query from a client may include preferred alignments and an expiration date of positions in the reference audio itself.

When receiving the music recognition module's response, the client can shift this information according to the passage of time, based on the knowledge of when (on the client's clock) the query audio had been recorded. For example, if a query has captured audio starting at time $T1$ and ending at time $T1+L1$ (these are client clock times, where $L1$ is the duration of the query) and the original music recognition response indicates that the matching reference is $R1$ with alignment $A1$ and expiration date $E1$, then the client can use this information at a later clock time $T2$ to predict a sync with the same reference $R1$ at shifted alignment $A2=A1+(T2-T1)$ in the reference audio, where the shift $(T2-T1)$ (a time interval measured and applied by the client) corrects for the elapsed time. Alignment $A2$ can be compared with the 'expiration alignment' $E1$ to see if the sync still holds. In other words, the client may check if the elapsed time $T2-T1$ is less than the validity interval $E1-A1$ suggested by the music recognition module's response. The outcome of this check is affected by computation and network delays, and such delays (if high) would cause a degradation of user experience.

The system displays text and automatically scrolls in time to the audio track 630. The client may display the lyrics in various levels of synchronization with the external audio playback: on a line level (advancing one line at a time), stanza/paragraph (multi-line), word, syllable, phoneme, and/or letter levels. The rest of this description will presume line-based synchrony, though this is not intended to limit the scope of the technology disclosed.

The system display a current text indicator visually synchronized to a current audio position 640, at least while the current text is visible in the interface window 320. When the user is on a page that shows more lyrics than those currently being emphasized, in order to facilitate the emphasis on the lyrics being uttered at a particular time, the client supports additional features. On such a page, a current text indicator (such as a box, larger font or other font style, highlighted words/lines, bouncing balls, or other graphic) may appear that embody or otherwise emphasize the current lyrics being uttered. If the user does not interact with the page, the lyrics may scroll in time with the music within the current text indicator, but the current text indicator may remain stationary in a "locked" state, thereby indicating the current lyrics.

Optionally, the system responds to a user scrolling input, updates the portion of the text displayed and suspends auto scrolling 650. The user may interact with the lyrics to scroll them up or down. In this case, the current text indicator may still stay synced to the music, maintaining whatever relationship necessary with the text so that the box frames the current line. However, the lyrics box may become "unlocked" if and when it is moved from its original starting position. A visual indication that the current text indicator is unlocked may be given to the user. The lyrics text may no longer automatically scroll, because the current text indicator has become unlocked. As noted above, the current text indicator will, however, be allowed to move against the text to stay current.

Optionally, the current text indicator may be relocked by the user. To do this, the user simply scrolls the lyrics such that the current text indicator returns to its starting position on the page. The current text indicator will change appearance when this is done so that the user knows he can leave the current text indicator in the locked position. A regularly-viewable "relocking button" may optionally be provided in the user interface allowing the relocking of the current text indicator, so that even if the current text indicator is scrolled off of the viewable page, it may be easily locked back on.

A special case may occur if, after the user has unlocked the current text indicator by scrolling it up off the page, the current text indicator winds up in its original, locked position by virtue of following along with the lyrics in real time. In this case, the current text indicator may become re-locked, and will stay in its original position, with the lyrics text moving rather than the current text indicator. Optionally, this behavior may be disabled through a setting. In such a case, the current text indicator would continue to progress through the original position and remain unlocked. It could still be relocked if the user manually scrolled it back to the original position or tapped the relocking button.

The user may eliminate the current text indicator and view the lyrics page without any scrolling by clicking a special button (which may, for example, appear as an "x" on the lower left corner of the lyrics box).

Optionally, the system periodically redetermines the current audio position and updates the display 660. The user may request that the client re-sync lyrics (whether the current text indicator is locked, unlocked, or eliminated) by clicking on a special re-sync button (which may, for example, appear as a "reload" symbol with a "recording dot" inside). When the audio track recognition server 112 returns sufficient data or the data is determined by the computing device 135, the system can automatically redetermine the current audio position. The audio track recognition server 112 may return to the client 145 one or a combination of the following: timing information about how far into the song the match occurred; lyrics data including words and timings of lines (though timing on other levels may be used as noted above); an estimate of how much longer the client should wait before resending more information to automatically re-sync lyrics. This is especially useful in the case where the portion of music initially recognized contains audio that is repeated during the song, such as in a chorus; an estimate of how long the current sync data is valid. For example, if the lyrics were to be synced during a chorus, the chorus might end and it would be unclear which verse's lyrics to show next. In that case the time validity estimate would be however many seconds exist before the new verse begins, and/or information about network latency, which must be compensated for in order to effectively display lyrics in coordination with the audio playback. Based on the above information, the client displays the received lyrics in coordination with the audio playback.

If the client 145 reaches the end of the time validity estimate before the lyrics have been successfully re-synced, the item that emphasizes the coordinated lyrics (for example the box within which coordinated lyrics is displayed) may fade out or otherwise disappears.

The client 145 may send data to refresh timing information (i.e. re-sync) pertaining to the displayed lyrics based on the resending time estimate provided by the music recognition module 225. If the client re-syncs the data, and the current text indicator is locked, the lyrics may move in coordination with the audio, and the current text indicator may stay still such that the newly estimated correct relationship with the lyrics is preserved. If the client re-syncs and the box is unlocked, the box may move while the lyrics do not. If the user re-syncs the data while the box is eliminated, the lyrics may move in coordination with audio while the box reappears in its original position, such that the newly estimated correct relationship with the lyrics is preserved. In certain implementations, the client may not re-sync lyrics automatically if the user has manually eliminated the lyrics box.

The re-synching process may occur in various example scenarios. In one case, the music recognition module does not find a high confidence match for the audio input. In this case, new audio may be sent by the client to the server to re-sync immediately (0 seconds delay) though other parameters from 0 to 30 seconds might also be used. In another case, the music recognition module returns a high confidence match. In this case, new audio may be sent to the server to re-sync after several seconds delay (such as 10 to 90 seconds delay) to ensure sync accuracy on the client. In a third case, the music recognition module may return a high confidence match for initial audio input(s), but returns a low confidence match for re-synced audio. In this case, new audio may be sent to re-sync after several seconds delay (such as 10 to 120 seconds delay) to ensure sync accuracy on the client. In yet another case, re-syncing is performed, and there is a high confidence match to the newly synced location. In this case, again new audio may be sent to re-sync after several seconds delay (such as 10 to 120 seconds delay) to ensure sync accuracy on the client. While the times given above indicate general guidelines, other times may be empirically determined to be more satisfactory, for instance by usability testing or from user feedback.

Figure 7:
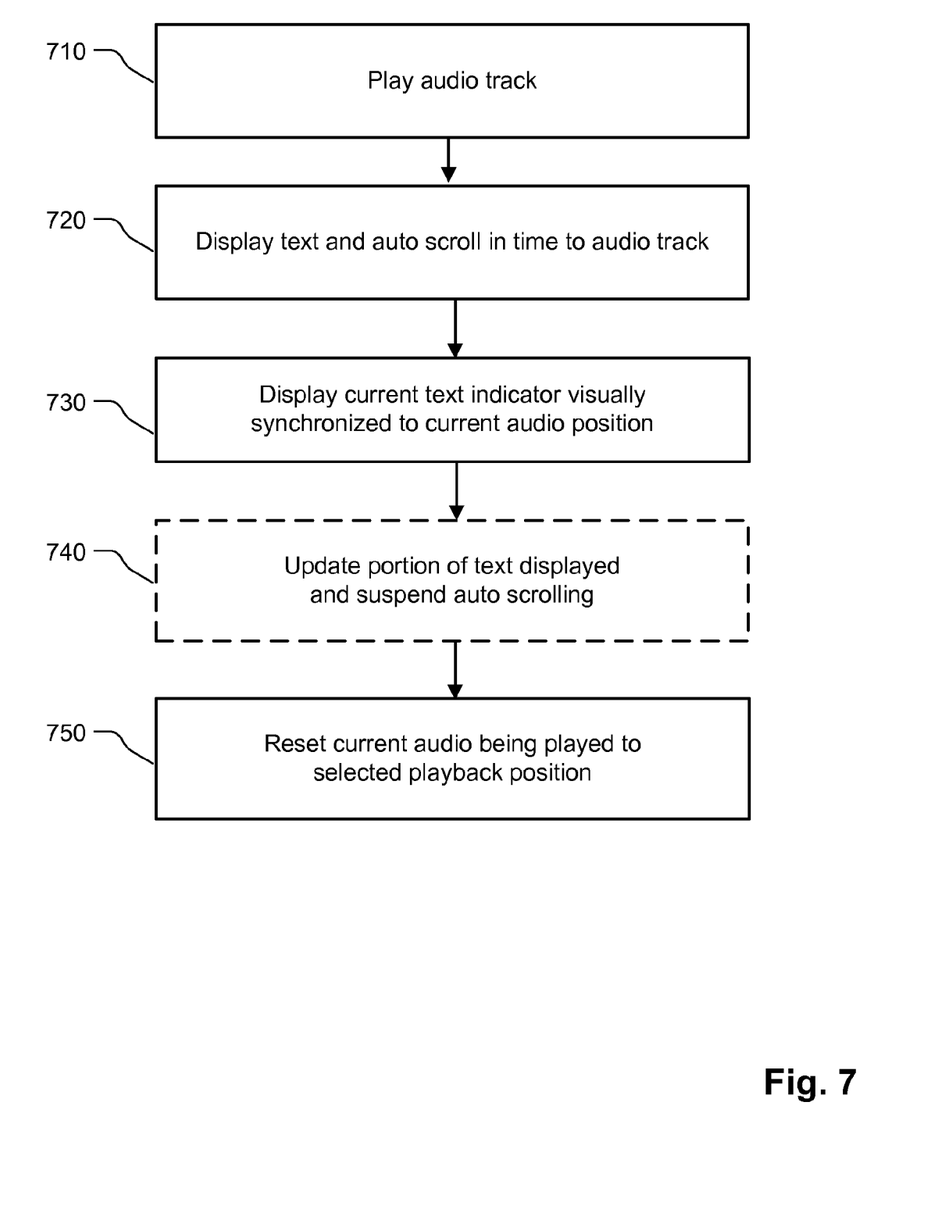
FIG. 7 is a flow chart illustrating an example process for displaying text in coordination with audio playback when the playback is from an audio track accompanied by linked and synchronized text.

FIG. 7 is a flow chart illustrating an example process for displaying text in coordination with audio playback when the playback is from an audio track accompanied by linked and synchronized text. For convenience, this example process will be described with respect to a system that performs at least part of the method. In this case, the system plays an audio track 710. The system displays lyrics in coordination with the audio that is played 720 from the device that displays the lyrics (e.g., an MP3 player, smart phone or tablet) or a device coupled to the an audio system (a media player such as AppleTV®, a smart DVD player or a TV with integrated access to media sources.) For example, lyrics may be displayed on an iPod® or an iPhone® in sync with the music played back from a local or cloud based library. The display of coordinated lyrics during playback is similar to display of coordinated lyrics during recognition. In some implementations, the synchronized text is linked to a particular audio file, instead of through a title of a song or other audio track. In other implementations, approximate timing might be used for a work instead of a particular audio file.

When audio playback and text display are coordinated on a computing device 135, the device can afford additional functionality. For example, a user may be on a player page resembling a lyrics display page described above, but with additional controls over music playback, including fast forwarding, rewinding, "scrubbing" or dynamic fast forward and rewind to different parts of a song.

All features and interaction described above including scrolling, locking, unlocking, eliminating or re-syncing may apply to actions 720, 730 and 740 of this method.

Additionally, the user may perform a specific interaction, such as a single or double tap, on any line of the lyrics, and in response the audio and scrub bar will move to that portion of the song, and the lyrics box will move to that line, and scroll the box and lyrics as necessary to achieve a locked state. Responsive to such input, the system resets the current audio being played to the user selected playback position 750.

Additionally, when the user moves the audio via the scrub bar on the player page (or via the miniplayer on any other page), a locked box will appear with the lyrics scrolled to the match location.

Figure 8:
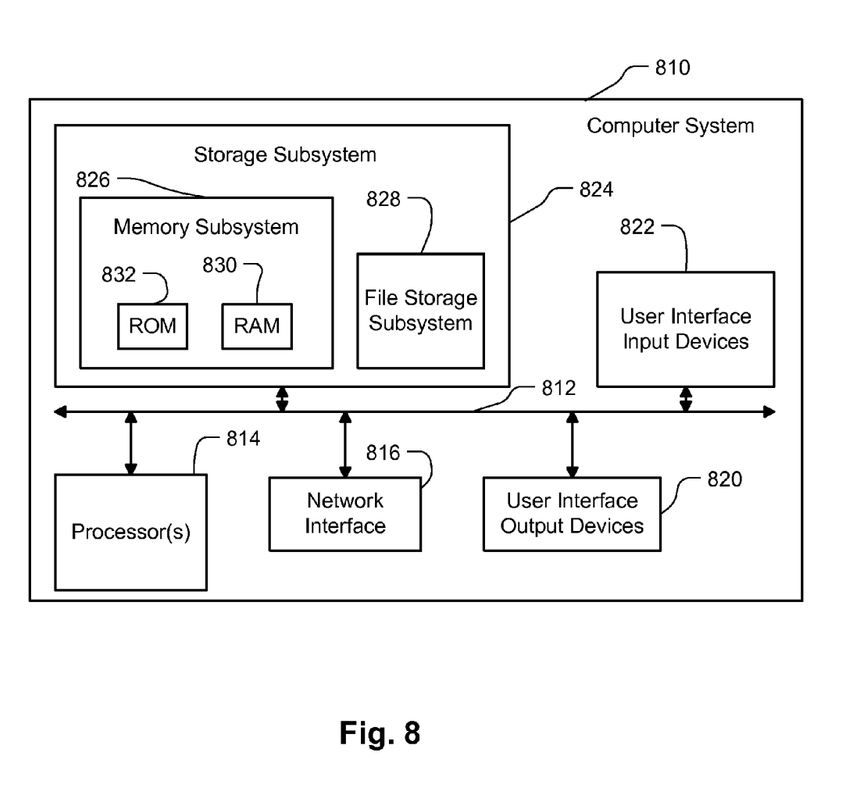
FIG. 8 is a block diagram of an example computer system.

FIG. 8 is a block diagram of an example computer system. A computer system 810 typically includes at least one processor 814, which communicates with a number of peripheral devices via a bus subsystem 812. These peripheral devices may include a storage subsystem 824, comprising for example memory devices and a file storage subsystem, user interface input devices 822, user interface output devices 820, and a network interface subsystem 816. The input and output devices allow user interaction with the computer system 810. A network interface subsystem 816 provides an interface to outside networks, including an interface to a communication network 125, and is coupled via the communication network 125 to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into a computer system 810 or onto a communication network 125.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

The storage subsystem 824 stores programming and data constructs that provide the functionality of some or all of the modules described herein, including the logic to create inferred queries for use as query suggestions according to the processes described herein. These software modules are generally executed by a processor 814 alone or in combination with other processors.

Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by the file storage subsystem 828 in the storage subsystem 824, or in other machines accessible by the processor.

Bus subsystem 812 provides a mechanism for letting the various components and subsystems of the computer system 810 communicate with each other as intended. Although bus subsystem 812 is shown schematically as a single bus, alternative embodiments of the bus subsystem may use multiple busses.

The computer system 810 can be of varying types including a workstation, server, computing cluster, blade server, server farm, or any other data processing system or computing device. Due to the ever-changing nature of computers and networks, the description of the computer system 810 depicted in FIG. 8 is intended only as an example for purposes of illustrating the preferred embodiments. Many other configurations of computer system 810 are possible having more or fewer components than the computer system depicted in FIG. 8.

Particular Embodiments

As summarized above, one aspect of the technology described can be embodied in methods that include the actions of receiving a signal corresponding to an audio track; determining from the signal, either directly or indirectly, an identity of the audio track and a current audio position within the audio track; displaying on a display a portion of a text that is linked and synchronized to the audio track identified and automatically scrolling the portion of the text displayed in pace with the audio track playing; and displaying a current text indicator that emphasizes current text, wherein the current text indicator is visually synchronized on the display to current audio playing from the audio track. The actions optionally include periodically redetermining the current audio position in the audio track from the signal received and updating synchronization of the current text indicator with the current audio playing. Other embodiments of this aspect include corresponding systems, apparatus, and computer program products.

These and other embodiments can optionally include one or more of the following features. In some implementations, the synchronized text is linked to a particular audio file, instead of through a title of a song or other audio track. In other implementations, approximate timing might be used for a work instead of a particular audio file. The signal may be captured from an external source as the audio track is playing. The audio track may be accompanied by video or multi media content. The display may be a touchscreen and actions may be taken responsive to user touches on an area of the touchscreen that displays the text. The text may be lyrics and the audio track musical. The audio track may be instrumental music and the lyrics text synchronized to the instrumental music. In some implementations, the determining further includes estimating a time that falls after completion of a repeating chorus; and the periodically redetermining further includes redetermining the current audio position after the estimated time. As described, a current text indicator may emphasize a stanza, paragraph or other portion of text. Responsive to user interaction with the display that scrolls the current text indicator beyond an area visible on the display, the method may feature displaying an updated portion of the text as the audio track continues to play and at least temporarily suspending the automatic scrolling of the portion of text displayed. When the user interaction scrolls the current text indicator beyond an area visible on the display to a position that precedes in time the updated portion of the text visible on the display, the system may automatically resume the automatic scrolling after the current text indicator reaches the updated portion of the text visible on the display. Other embodiments of the optional features include corresponding systems, apparatus and computer program products.

Another aspect of the technology described can be embodied in methods that include the actions of playing an audio track; displaying on a display a portion of a text that is linked and synchronized to the audio track identified and automatically scrolling the portion of the text displayed in pace with the audio track playing; displaying a current text indicator that emphasizes current text, wherein the current text indicator is visually synchronized on the display to the current audio playing from the audio track; and responsive to user interaction with the display that selects a playback position from within the portion of the text displayed, controlling the current audio being played to reset the current audio being played to the selected playback position. When the text more than fills portion of the display available, the actions may include, responsive to user interaction with the display that scrolls the current text indicator beyond an area visible on the display, displaying an updated portion of the text as the audio track continues to play. The actions optionally include, responsive to user interaction with the display that scrolls the current text indicator beyond an area visible on the display, at least temporarily suspending the automatic scrolling of the portion of text displayed. These and other embodiments can optionally include one or more of the features described above. Other embodiments include corresponding systems, apparatus, and computer program products.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for creating inferred queries for use as query suggestions, systems including logic and resources to create inferred queries for use as query suggestions, systems that take advantage of computer-assisted methods for creating inferred queries for use as query suggestions, media impressed with logic to create inferred queries for use as query suggestions, data streams impressed with logic to create inferred queries for use as query suggestions, or computer-accessible services that carry out computer-assisted methods for creating inferred queries for use as query suggestions. It is contemplated that modifications and combinations will readily occur to those skilled in the art, which modifications and combinations will be within the scope of the following claims.

What is claimed is:

1. A method of providing text responsive to detection of audio playing, including:
   receiving a signal corresponding to an audio track;
   determining from the signal an identity of the audio track and a current audio position within the audio track;
   displaying on a display a portion of a text that is linked and synchronized to the audio track identified and automatically scrolling the portion of the text displayed in pace with the audio track playing; and
   displaying a current text indicator that emphasizes current text, wherein the current text indicator is visually synchronized on the display to current audio playing from the audio track;
   wherein the display is a touchscreen, further including, responsive to user interaction with the display that scrolls the current text indicator beyond an area visible on the display, displaying an updated portion of the text as the audio track continues to play and at least temporarily suspending the automatic scrolling of the portion of text displayed until the audio track catches up with the portion of the text displayed.

2. The method of claim 1, wherein the signal corresponds to audio captured from an external source as the audio track is playing.

3. The method of claim 1, wherein the text is lyrics and the audio track is musical.

4. The method of claim 1, wherein the current text indicator emphasizes a stanza or paragraph of text.

5. The method of claim 1, further including receiving a validity interval and redetermining the current audio position in the audio track upon expiration of the validity interval from an additional portion of the signal received and updating synchronization of the current text indicator with the current audio playing.

6. A non-transitory computer storage medium encoded with a computer program, the program comprising instructions that when executed by data processing apparatus cause the data processing apparatus to perform operations comprising:
  receiving a signal corresponding to an audio track;
  determining from the signal an identity of the audio track and a current audio position within the audio track;
  displaying on a display a portion of a text that is linked and synchronized to the audio track identified and automatically scrolling the portion of the text displayed in pace with the audio track playing; and
  displaying a current text indicator that emphasizes current text, wherein the current text indicator is visually synchronized on the display to current audio playing from the audio track
  wherein the display is a touchscreen, further including, responsive to user interaction with the display that scrolls the current text indicator beyond an area visible on the display, displaying an updated portion of the text as the audio track continues to play and at least temporarily suspending the automatic scrolling of the portion of text displayed until the audio track catches up with the portion of the text displayed.

7. The non-transitory computer storage medium of claim 6, wherein the signal corresponds to audio captured from an external source as the audio track is playing.

8. The non-transitory computer storage medium of claim 6, wherein the text is lyrics and the audio track is musical.

9. The non-transitory computer storage medium of claim 6, wherein the current text indicator emphasizes a stanza or paragraph of text.

10. The non-transitory storage medium of claim 6, wherein the computer program instructions, when executed, further cause the data processing apparatus to perform operations comprising receiving a validity interval and redetermining the current audio position in the audio track upon expiration of the validity interval from an additional portion of the signal received and updating synchronization of the current text indicator with the current audio playing.

11. A system comprising:
  one or more processors configured to perform operations comprising:
  receiving a signal corresponding to an audio track;
  determining from the signal an identity of the audio track and a current audio position within the audio track;
  displaying on a display a portion of a text that is linked and synchronized to the audio track identified and automatically scrolling the portion of the text displayed in pace with the audio track playing; and
  displaying a current text indicator that emphasizes current text, wherein the current text indicator is visually synchronized on the display to current audio playing from the audio track
  wherein the display is a touchscreen, further including, responsive to user interaction with the display that scrolls the current text indicator beyond an area visible on the display, displaying an updated portion of the text as the audio track continues to play and at least temporarily suspending the automatic scrolling of the portion of text displayed until the audio track catches up with the portion of the text displayed.

12. The system of claim 11, wherein the signal corresponds to audio captured from an external source as the audio track is playing.

13. The system of claim 11, wherein the text is lyrics and the audio track is musical.

14. The system of claim 11, wherein the current text indicator emphasizes a stanza or paragraph of text.

15. The system of claim 11, wherein the processors are further configured to perform operations comprising receiving a validity interval and redetermining the current audio track upon expiration of the validity interval from an additional portion of the signal received and updating synchronization of the current text indicator with the current audio playing.

16. A method of providing text responsive to detection of audio playing, including:
  receiving a signal corresponding to an audio track;
  determining from the signal an identity of the audio track and a current audio position within the audio track, including a validity interval;
  displaying on a display a portion of a text that is synchronized to the audio track identified and automatically scrolling the portion of the text displayed in pace with the audio track playing;
  displaying a current text indicator that emphasizes current text; and
  upon expiration of the validity interval, automatically redetermining the current audio position in the audio track from an additional portion of the signal received and updating synchronization of the current text indicator with the current audio playing.

17. The method of claim 16, wherein the text is lyrics and the audio track is musical.

18. The method of claim 16, wherein the current text indicator emphasizes a stanza or paragraph of text.

* * * * *